United States Patent
Cheng et al.

(10) Patent No.: US 10,662,954 B2
(45) Date of Patent: May 26, 2020

(54) DIRECT NUMERIC AFFINITY MULTISTAGE PUMPS SENSORLESS CONVERTER

(71) Applicant: FLUID HANDLING LLC., Morton Grove, IL (US)

(72) Inventors: Andrew A. Cheng, Wilmette, IL (US); Kyle D. Schoenheit, Waterloo, NY (US)

(73) Assignee: Fluid Handling LLC, Morton Grove, IL (US)

(*) Notice: Subject to any disclaimer, the term of this patent is extended or adjusted under 35 U.S.C. 154(b) by 191 days.

(21) Appl. No.: 15/604,990

(22) Filed: May 25, 2017

(65) Prior Publication Data

US 2017/0370362 A1 Dec. 28, 2017

Related U.S. Application Data (60) Provisional application No. 62/341,767, filed on May 26, 2016.

(51) Int. Cl.
*F04B 49/08* (2006.01)
*F04D 15/02* (2006.01)
(Continued)

(52) U.S. Cl.
CPC ............ *F04D 15/029* (2013.01); *F04B 23/04* (2013.01); *F04B 49/065* (2013.01); *F04B 49/08* (2013.01); *F04B 51/00* (2013.01); *F04D 15/0072* (2013.01); *G01F 9/001* (2013.01); F04B 2203/0208 (2013.01);
(Continued)

(58) Field of Classification Search
CPC .. F04D 15/00; F04D 15/0066; F04D 15/0072; F04B 2205/09
See application file for complete search history.

(56) References Cited

U.S. PATENT DOCUMENTS

| | | | |
|---|---|---|---|
| 5,318,409 A | 6/1994 | London et al. | |
| 6,354,805 B1 | 3/2002 | Moller | |

(Continued)

FOREIGN PATENT DOCUMENTS

JP    2014095354 A    5/2014

OTHER PUBLICATIONS

English language abstract of JP2014095354.
(Continued)

*Primary Examiner* — Patrick Hamo
(74) *Attorney, Agent, or Firm* — Ware, Fressola, Maguire & Barber LLP (57) ABSTRACT

Apparatus, including a pump system controller, features a signal processor or processing module configured at least to: receive signaling containing information about pump differential pressure, flow rate and corresponding power data at motor maximum speed published by pump manufacturers, as well as instant motor power and speed, for a system of pumps arranged in a multiple pump configuration; and determine corresponding signaling containing information about instant pump differential pressure and flow rate for the system of pumps arranged in the multiple pump configuration using a combined affinity equation and numerical interpolation algorithm, based upon the signaling received.

6 Claims, 8 Drawing Sheets

Characteristics curves for multiple pumps configured (a) in series and (b) in parallel as well as system curve with the pressure equilibrium point at a steady flow state.

(51) Int. Cl.
  *F04B 51/00*   (2006.01)
  *G01F 9/00*    (2006.01)
  *F04B 49/06*   (2006.01)
  *F04B 23/04*   (2006.01)
  *F04D 15/00*   (2006.01)
  *G01F 1/34*    (2006.01)

(52) U.S. Cl.
  CPC ... *F04B 2203/0209* (2013.01); *F04B 2205/07* (2013.01); *F04B 2205/09* (2013.01); *G01F 1/34* (2013.01)

(56) References Cited

U.S. PATENT DOCUMENTS

| | | | |
|---|---|---|---|
| 7,177,120 | B2 | 2/2007 | Freitag et al. |
| 7,462,019 | B1 | 12/2008 | Allarie et al. |
| 7,470,246 | B2 | 12/2008 | Mori et al. |
| 7,645,124 | B2 | 1/2010 | Garlow |
| 7,945,411 | B2 * | 5/2011 | Kernan .............. F04D 27/001 702/100 |
| 8,226,373 | B2 | 7/2012 | Yaegashi et al. |
| 8,417,483 | B2 | 4/2013 | Anderson et al. |
| 8,613,600 | B2 | 12/2013 | Losch et al. |
| 8,672,641 | B2 | 3/2014 | Yuratich et al. |
| 8,774,972 | B2 | 7/2014 | Rusnak et al. |
| 8,801,389 | B2 | 8/2014 | Stiles, Jr. et al. |
| 9,091,259 | B2 | 7/2015 | Tamminen et al. |
| 9,109,590 | B2 | 8/2015 | Meza et al. |
| 9,206,814 | B2 * | 12/2015 | Satishchandra ......... F04D 13/02 |
| 9,611,856 | B2 * | 4/2017 | Cheng ................ F04D 15/0066 |
| 9,897,084 | B2 * | 2/2018 | Cheng .................... F04B 49/065 |
| 9,938,970 | B2 * | 4/2018 | Cheng ..................... F04B 51/00 |
| 10,119,545 | B2 * | 11/2018 | Cheng ................ F04D 15/0088 |
| 2007/0212210 | A1 | 9/2007 | Kernan et al. |
| 2012/0251340 | A1 | 10/2012 | Ahonen et al. |
| 2013/0204546 | A1 * | 8/2013 | Devine .................. F04B 51/00 702/45 |
| 2014/0135999 | A1 | 5/2014 | Stavale |
| 2014/0288716 | A1 | 9/2014 | Cheng et al. |
| 2016/0010639 | A1 | 1/2016 | Cheng et al. |

OTHER PUBLICATIONS

Pechenik, M., et al. "Sensorless control of water supply pump based on neural network estimation." 2011.(5 pages).

Germanov, Artur. "Design of the sensorless pressure control system for a centrifugal pump." 2015, printed on Jun. 10, 2016. (57 pages).

Vodovozov, Valery, Levon Gevorkov, and Zoja Raud. "Modeling and Analysis of Pumping Motor Drives in Hardware-in-the-Loop Environment." Journal of Power and Energy Engineering Oct. 2014. (9 pages).

English language abstract and introduction of Bakman, Ilja, and Valery Vodovozov. "Sensorless pressure control of centrifugal pumps." Compatibility and Power Electronics (CPE), 2013 8th International Conference on. IEEE, Sep. 19, 2013. See http://ieeexplore.ieee.org/xpls/abs_all.jsp?arnumber=6601174.

* cited by examiner

FIG. 1A  FIG. 1B

FIG. 1: Sensorless multistage pumping control system.

FIG. 2: Sensorless multistage pumping control system for agriculture applications

Figure 3. Pump, system and power characteristics curves with the pressure equilibrium point at a flow steady state.

Figure 4. Characteristics curves for multiple pumps configured (a) in series and (b) in parallel as well as system curve with the pressure equilibrium point at a steady flow state.

Figure 5. Characteristics curves for a multiple pumps system configured in parallel.

Fig. 7A: Flow rate

Fig. 7B: Pressure

Fig. 7C: Pump curves

Figure 7. a) Pump flow rate readings vs. drive power and speed, b) Pump differential pressure vs. drive power and speed, c) pump curves vs. speed, where the dot lines represent the measured values through flow and pressure sensors and solid lines represent the converted values from Xylem sensorless converter.

Fig. 8A: Flow rate

Fig. 8B: Pressure

Fig. 8C: Prmp curves

Figure 8. a) pump flow rate readings vs. drive power and speed, b) pump differential pressure vs. drive power and speed, c) pump curves vs. speed, where the dot lines represent the measured values through flow and pressure sensors and solid lines represent the converted values from the sensorless converter.

Apparatus 10, e.g., including a system of pumps arranged in a multiple pump configuration, > A controller 10a having a signal processor or processing module configured at least to:
>
> > receive signaling containing information about pump differential pressure, flow rate and corresponding power data at motor maximum speed published by pump manufacturers, as well as instant motor power and speed, for a system of pumps arranged in a multiple pump configuration;
> >
> > determine corresponding signaling containing information about instant pump differential pressure and flow rate for the system of pumps arranged in the multiple pump configuration using a combined affinity equation and numerical interpolation algorithm, based upon the signaling received; and/or
> >
> > provide the corresponding signaling as control signaling to control the apparatus, e.g., including the system of pumps.
>
> Other signal processor circuits or components 10b that do not form part of the underlying invention, e.g., including input/output modules, one or more memory modules, data, address and control busing architecture, etc.

Figure 9

DIRECT NUMERIC AFFINITY MULTISTAGE PUMPS SENSORLESS CONVERTER

CROSS REFERENCE TO RELATED APPLICATION

This application claims benefit to U.S. provisional application No. 62/341,767, filed 26 May 2016, which is hereby incorporated by reference in its entirety.

The present invention builds on the family of technologies disclosed in the other related applications identified below.

BACKGROUND OF THE INVENTION

1. Field of the Invention

The present invention relates to a technique for controlling a system of pumps; and more particularly relates to a technique for controlling a system of pumps arranged in a multiple pump configuration.

2. Brief Description of Related Art

In our previous works on hydronic pumping system sensorless control and monitoring, several discrete or numerical sensorless conversion techniques or means are developed in reference nos. [1-5] set forth below. Following those technologies developed, the pump system pressure and flow rate can be converted from a pair of motor readout values directly with reasonably satisfactory conversion accuracy.

The reference nos. [1-5] include the patent applications, as follows:

[1] U.S. application Ser. No. 14/091,795, filed 27 Nov. 2013, entitled "3D sensorless conversion method and apparatus," which claims benefit to U.S. provisional application No. 61/771,375, filed 1 Mar. 2013, now abandoned;

[2] U.S. application Ser. No. 14/187,817, filed 24 Feb. 2014, entitled "A Mixed Theoretical And Discrete Sensorless Converter For Pump Differential Pressure And Flow Monitoring," which claims benefit to U.S. provisional application No. 61/803,258, filed 19 Mar. 2013, now abandoned;

[3] U.S. application Ser. No. 14/339,594, filed 24 Jul. 2014, entitled "Sensorless Adaptive Pump Control with Self-Calibration Apparatus for Hydronic Pumping System," which claims benefit to U.S. provisional application Ser. No. 61/858,237 filed 25 Jul. 2013, now abandoned;

[4] U.S. application Ser. No. 14/680,667, filed 7 Apr. 2015, entitled "A Best-fit affinity sensorless conversion means for pump differential pressure and flow monitoring," which claims benefit to provisional patent application Ser. No. 61/976,749, filed 8 Apr. 2014, now abandoned; and

[5] U.S. application Ser. No. 15/173,781, filed 6 Jun. 2016, entitled "Direct numeric affinity pumps sensorless converter," which claims benefit to provisional patent application Ser. No. 62/170,997, filed 4 Jun. 2015, now abandoned;

which are all hereby incorporated by reference.

In pumping applications, there are always some needs for a multistage pump or a group of multiple pumps configured for high water pressure or large flow rate applications. Very often, the multistage pumps may be configured as a pumps group ganged in parallel or in series as shown in FIGS. 1 and 2. For a multiple pumps system grouped in series or in parallel, which may have specific hydronic characteristics in nature, a sensorless converter for deriving the instant total pressure and flow rate for a multiple pumps application may be needed.

SUMMARY OF THE INVENTION

In summary, the present invention provides a direct numeric affinity multistage pumps sensorless converter, based upon individual pump hydronic characteristics as well as the pump affinity law. The sensorless conversion procedures and formulations for the multiple pumps configuration in series or in parallel are presented, which makes the sensorless conversion for multiple pumps application achievable while the satisfactory conversion accuracy is preserved.

Specific Embodiments

By way of example, the present invention provides a new and unique technique for a pumping control application.

According to some embodiments, the present invention may include, or take the form of, a method or apparatus, e.g., in multistage pumps sensorless converter control applications or systems, featuring a signal processor or signal processing module, configured to:

receive signaling containing information about pump differential pressure, flow rate and corresponding power data at motor maximum speed published by pump manufacturers, as well as instant motor power and speed, for a system of pumps arranged in a multiple pump configuration; and determine corresponding signaling containing information about instant pump differential pressure and flow rate for the system of pumps arranged in the multiple pump configuration using a combined affinity equation and numerical interpolation algorithm, based upon the signaling received.

According to some embodiments, the present invention may include one or more of the following features:

The signal processor or processing module may be configured to provide the corresponding signaling as control signaling to control the system of pumps in the multiple pump configuration. By way of example, the instant pump differential pressure and flow rate determined for the system of pumps arranged in the multiple pump configuration may be either further processed and used for further determining control signaling to control the system of pumps in the multiple pump configuration, or may be used as, or form part of, such control signaling to control the system of pumps in the multiple pump configuration.

The signal processor or processing module may be configured to determine the corresponding signaling by implementing the combined affinity equation and numerical interpolation algorithm as follows:

obtaining a corresponding maximum power at the pump's maximum speed with respect to the instant motor power and speed parameters using a power affinity equation;

obtaining corresponding pump differential pressure and flow rate with respect to the corresponding maximum power at the pump's maximum speed using direct numerical interpolation; and determining the instant pump differential pressure and flow rate with respect to the instant motor speed and power by using pressure and flow affinity equations.

The signal processor or processing module may be configured to determine the instant pump differential pressure and flow rate by implementing the combined affinity equation and numerical interpolation algorithm and using numerical computation procedures as follows:

$$Q(n, w) = \left(\frac{n}{n_{max}}\right) \cdot \bar{q}(n_{max}, W_i, Q_i, \hat{w}(n, w)), \quad (1)$$

$$P(n, w) = \left(\frac{n}{n_{max}}\right)^2 \cdot \bar{p}(n_{max}, W_i, P_i, \hat{w}(n, w)), \quad (2)$$

where $\bar{q}(n_{max}, W_i, Q_i, \hat{w})$ and $\bar{p}(n_{max}, W_i, P_i, \hat{w})$ are pump differential pressure and flow rate distribution functions with respect to power and formulated numerically based upon discrete pump data of $(P_i, Q_i, W_i)$ at motor full speed, and $\hat{w}$ is a corresponding power function at pump full speed by the power affinity equation of $$\hat{w}(n,w) = n/n_{max})^{-3} \cdot w \quad (3)$$

The apparatus may include the system of pumps arranged in the multiple pump configuration, including where the system of pumps are arranged in series in the multiple pump configuration, or where the system of pumps are arranged in parallel in the multiple pump configuration The apparatus may include, or take the form of, a controller configured with the signal processor or processing module for controlling the system of pumps in the multiple pump configuration, e.g., including a system of pumps in a hydronic pumping system.

The apparatus may include, or take the form of, the system of pumps having a controller, including where the pump controller is configured with the signal processor or processing module for controlling the pump, e.g., including where the system of pumps includes, or takes the form of, a hydronic pumping system.

By way of example, the signal processor or processing module may include, or take the form of, at least one signal processor and at least one memory including computer program code, and the at least one memory and computer program code are configured to, with at least one signal processor, to cause the signal processor at least to receive the signaling and determine the corresponding signaling, based upon the signaling received. The signal processor or processing module may be configured with suitable computer program code in order to implement suitable signal processing algorithms and/or functionality, consistent with that set forth herein. One skilled in the art would appreciate and understand how to implement any such computer program code to perform the signal processing functionality set forth herein without undue experimentation based upon that disclosed in the instant patent application.

According to some embodiments, the present invention may also take the form of a method including steps for:
  receiving in a signal processor or processing module signaling containing information about pump differential pressure, flow rate and corresponding power data at motor maximum speed published by pump manufacturers, as well as instant motor power and speed, for a system of pumps arranged in a multiple pump configuration; and
  determining in the signal processor or processing module corresponding signaling containing information about instant pump differential pressure and flow rate for the system of pumps arranged in the multiple pump configuration using a combined affinity equation and numerical interpolation algorithm, based upon the signaling received.

The method may also include one or more of the features set forth herein, including providing from the signal processor or processing module the corresponding signaling as control signaling to control the system of pumps in the multiple pump configuration, e.g., consistent with that set forth herein.

The present invention provides a new technique that is a further development of, and builds upon, the aforementioned family of technologies set forth herein.

BRIEF DESCRIPTION OF THE DRAWING

The drawing includes the following Figures, which are not necessarily drawn to scale:

FIG. 1 includes FIGS. 1A and 1B, which show examples of sensorless multistage pumping control systems for commercial or industrial applications.

FIG. 7 includes FIGS. 7A, 7B and 7C showing graphs having pressure and flow rate values for a 33SV pump (two-stage pump), where

FIG. 8 includes FIGS. 8A, 8B and 8C showing graphs having pressure and flow rate values for a 10SV pump (five-stage pump), where

DETAILED DESCRIPTION OF THE INVENTION

In summary, according to the present invention, a new and unique direct numeric affinity multistage pumps sensorless converter to obtain instant total pump differential pressures and flow rate directly is set forth herein, e.g., based upon individual pump hydronic characteristics as well as the pump affinity law. The sensorless conversion procedures and formulations for the multiple pumps configuration in series or in parallel are presented herein, e.g., which may have their own specific hydronic characteristics in nature. The technique developed and disclosed herein can be applied to any form of pump characteristics distribution, e.g., including for simple or complicated pump systems, in a multistage pumps configuration, and is easy to be set up while the satisfactory conversion accuracy is preserved.

Direct Numeric Affinity Multistage Pump Sensorless Conversion Method

Techniques related to a multistage pump system at a steady flow state of a close loop system, e.g., having characteristics curves for multiple pumps configured in parallel or in serials, are considered and developed out herein. By following the superposition principle on each individual pump, the overall instant pump characteristic curve at a given speed of n represents the total pump differential pressure P with respect to flow rate Q at the speed for the multistage pump configured. The instant system curve represents the system flow equation of $C_v = Q/\sqrt{P}$ accordingly.

Figure 3:
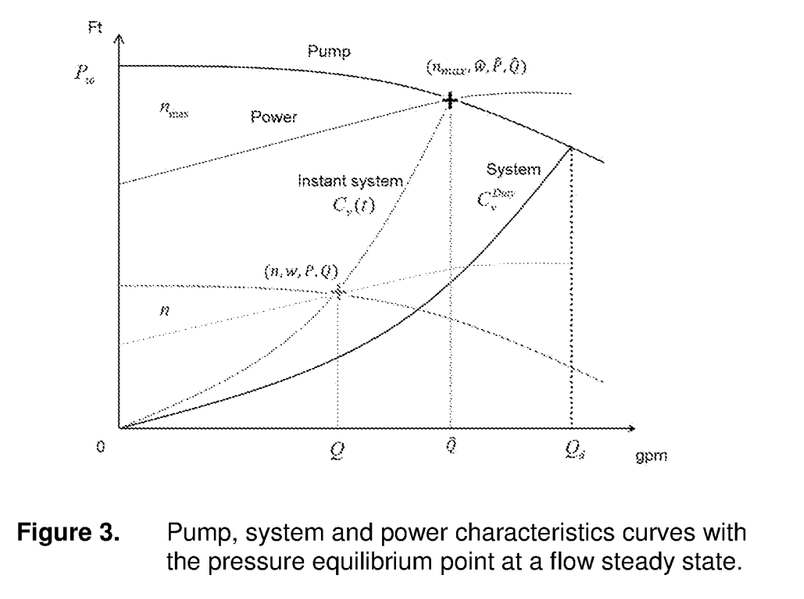
FIG. 3 shows a graph of pressure (Ft) versus flow (gpm) having pump, system and power characteristic curves with a pressure point equilibrium point at a flow steady state.

The numerical computational procedures to obtain instant pump differential pressure and flow rate disclosed in reference no. [5] herein and shown in FIG. 3 are as following. First, the corresponding maximum power for an individual pump at its maximum speed may be obtained with respect to a pair of instant motor power and speed by using power affinity equation. The corresponding pump differential pressure and flow rate at pump maximum speed with respect to the maximum power may then be obtained by numeric interpolation directly and respectively. The instant individual pressure and flow rate with respect to instant motor speed and power can then be achieved by the pressure and flow affinity equations based upon the maximum pump differential pressure and flow rate obtained. The instant total pump differential pressure and flow rate can then be obtained by superposition of each individual pump pressure and flow rate, respectively.

By utilizing the direct numerical affinity sensorless conversion approach set forth above and further detailed in reference no. [5] herein, the instant total pressure and flow rate with respect to instant motor speed and power for a multistage pumps system ganged in parallel or in serials may be derived accordingly as following.

1) A Multistage Pump or a Grouped Multiple Pumps in Series

Consider a multistage pump or a grouped multiple pumps in series as shown schematically in FIG. 4B. By following the superposition on individual pump pressure and based upon the total flow rate is the same through each individual pump in series, the total pump differential pressure and flow rate for a multistage pump or multiple pumps in series by following the numerical computation procedure described in reference no. [5] herein may be written in a form of $$Q = \left(\frac{n_j}{n_{jmax}}\right) \bar{q}_j(n_{jmax}, W_{ji}, Q_{ji}, \hat{w}_j(n_j, w_j)), \qquad (1)$$

$$P = \sum_{j=1}^{M} \left(\left(\frac{n_j}{n_{jmax}}\right)^2 \bar{p}_j(n_{max}, W_{ji}, P_{ji}, \hat{w}_j(n_j, w_j))\right), \qquad (2)$$

where $\bar{q}_j(n_{jmax}, W_{ji}, Q_{ji}, \hat{w}_j$ and $\bar{p}_j(n_{jmax}, W_{ji}, P_{ji}, \hat{w}_j(n_j, w_j))$ are the pump differential pressure and flow rate distribution functions with respect to power and are formulated numerically based upon the discrete pump data of $(P_{ji}, Q_{ji}, W_{ji})$, where i=1 ... N denotes the number of points on the discrete pressure and flow rate distribution curves of $\bar{p}_j$ and $\bar{q}_j$ at motor maximum speed of $n_{jmax}$ (or at a reference speed), and where j=1 ... M is the number of pump j. $\hat{w}_j$ is the corresponding power function of pump j at its maximum speed which may be obtained by the power affinity equation of pump as $$\hat{w}_j(n_j, w_j) = \left(\frac{n_j}{n_{jmax}}\right)^{-3} w_j$$

or its modified version as $$\hat{w}_j(n, w) = \hat{w}_j(n_{ji}, W_{ji}, n_j) \cdot w_j \qquad (3)$$

where $\overline{w}_i$ is the power distribution function calibrated based upon an array of the discrete and normalized motor power data of $(n_{ji}, W_{ji})$ for pump j at its maximum speed and at any system position, e.g., see reference nos. [1,5]. The distribution functions of $\bar{q}_j$, $\bar{p}_j$ and $\overline{w}_j$ may be formulated directly through the numerical means, based upon their discrete pump testing data. For a little complicated distributions, however, the piecewise numeric interpolation may be recommended to achieve better functional representation and accuracy. Note that the monotonic distribution on power with respect to flow is required here as well, which is exactly the same as for other pump sensorless converters currently using. By way of example, the numerical procedure for sensorless conversion is detailed in the direct numerical affinity sensorless conversion approach set forth in in reference no. [5] herein.

In case if all the pumps are identical with respect to their hydronic characteristics and run at the same speed as for a multistage pump, total pump differential pressure and flow rate for a multistage pump or multiple pumps in series may be expressed by superposition principle as follows:

$$Q(n, w) = \left(\frac{n}{n_{max}}\right) \bar{q}(n_{max}, W_i, Q_i, \hat{w}(n, w)), \qquad (4)$$

$$P(n, w) = M \left(\frac{n}{n_{max}}\right)^2 \bar{p}(n_{max}, W_i, P_i, \hat{w}(n, w)), \qquad (5)$$

where the pump number j is ignored for simplicity, and M is the total number of pumps in series or the total number impellers of a multistage pump. Note that: if overall pressure and flow rate distribution as a whole is considered, for instance, for a multistage pump with same impeller size, then one simply removes M from the equations above and take the total pressure and flow rate distributions curves of $\bar{p}$ and $\bar{q}$ into the equations respectively.

2) A Multiple Pumps Ganged in Parallel

Figures 5, 5A:
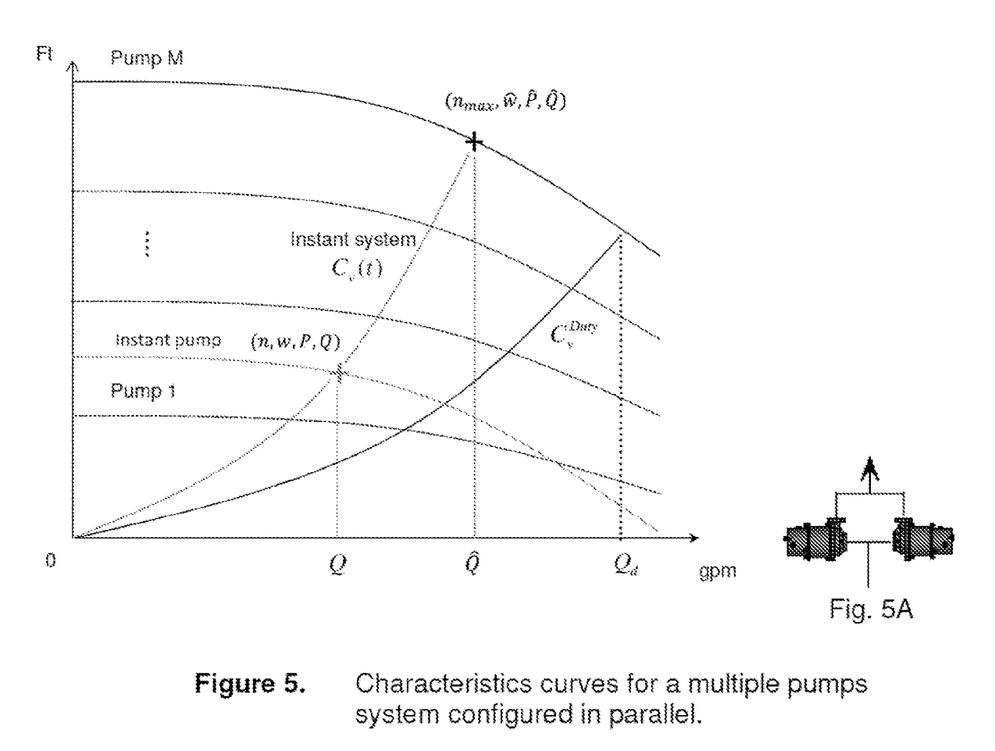
FIG. 5 shows a graph of pressure (Ft) versus flow (gpm) having characteristic curves for multiple pumps systems configured in parallel.
FIG. 5A shows an example of multiple pumps arranged in parallel.

By way of example, consider a multiple pumps system ganged in parallel as shown schematically in FIG. 5. By following the superposition on individual pump flow rate, and based upon the fact that pump differential pressure generated at their ganged point for each individual pump at a given speed of n is the same, the instant total pump differential pressure and flow rate for a ganged multiple pumps in parallel may therefore be formulated directly in a form of the following:

$$Q = \sum_{j=1}^{M}\left(\left(\frac{n_j}{n_{jmax}}\right)\bar{q}_j(n_{jmax}, W_{ji}, Q_{ji}, \hat{w}_j(n_j, w_j))\right), \quad (6)$$

$$P = \left(\frac{n_j}{n_{jmax}}\right)^2 \bar{p}_j(n_{jmax}, W_{ji}, P_{ji}, \hat{w}_j(n_j, w_j)). \quad (7)$$

where $\bar{q}_j(n_{jmax}, W_{ji}, Q_{ji}, \hat{w}_j(n_j, w_j))$ and $\bar{p}_j(n_{jmax}, W_{ji}, P_{ji}, \hat{w}_j(n_j, w_j))$ are the pump differential pressure and flow rate distribution functions with respect to power and are formulated numerically based upon the discrete pump data of $(P_{ji}, Q_{ji}, W_{ji})$, where $i=1\ldots, N$ denotes the number of points on the discrete pressure and flow rate distribution curves of $\bar{p}_j$ and $\bar{q}_j$ at motor maximum speed of $n_{jmax}$ (or at a reference speed), and where $j=1\ldots M$ is the number of pump j. $\hat{w}_j$ is the corresponding power function of pump j at its maximum speed which may be obtained by the power affinity equation of pump as $$\hat{w}_j(n_j, w_j) = \left(\frac{n_j}{n_{jmax}}\right)^{-3} w_j$$

or its modified version as $\hat{w}_j(n, w) = \hat{w}_j(n_{ji}, W_{ji}, n_j) \cdot w_j$, where $\bar{w}_j$ is the power distribution function calibrated based upon an array of the discrete and normalized motor power data of $(n_{ji}, W_{ji})$ for pump j at its maximum speed and at any system position, e.g., see reference nos. [1, 5] herein. The distribution functions of $\bar{q}_j, \bar{p}_j$ and $\bar{w}_j$ may be formulated directly through the numerical means, based upon their discrete pump testing data. For a little or less complicated distributions, however, the piecewise numeric interpolation may be recommended to achieve better functional representation and accuracy. Note that the monotonic distribution on power with respect to flow is required here as well, exactly the same as for other pump sensorless converters currently using. The numerical procedure for sensorless conversion is detailed in the direct numerical affinity sensorless conversion approach set forth in reference no. [5].

In most practical pumping applications with a multiple pumps system configured in parallel, all the pumps are almost identical with respect to their hydronic characteristics distribution and run at the exact same speed provided by pump controller through their corresponding motor drives. Therefore, the total pump differential pressure and flow rate for a ganged multiple pumps in parallel may be expressed as follows:

$$Q = M\left(\frac{n}{n_{max}}\right)\bar{q}(n_{max}, W_i, Q_i, \hat{w}(n, w)), \quad (8)$$

$$P = \left(\frac{n}{n_{max}}\right)^2 \bar{p}(n_{max}, W_i, P_i, \hat{w}(n, w)), \quad (9)$$

where the pump number j is ignored for simplicity, and M is the total number of pumps in parallel. Note that: if overall pressure and flow rate distribution as a whole is considered, for instance, for a multistage pump with same impeller size, then one simply removes M from the equations above and take the total pressure and flow rate distributions curves of $\bar{p}$ and $\bar{q}$ into the equations respectively.

Verification

1) Lab Test Setup

Figure 6A:
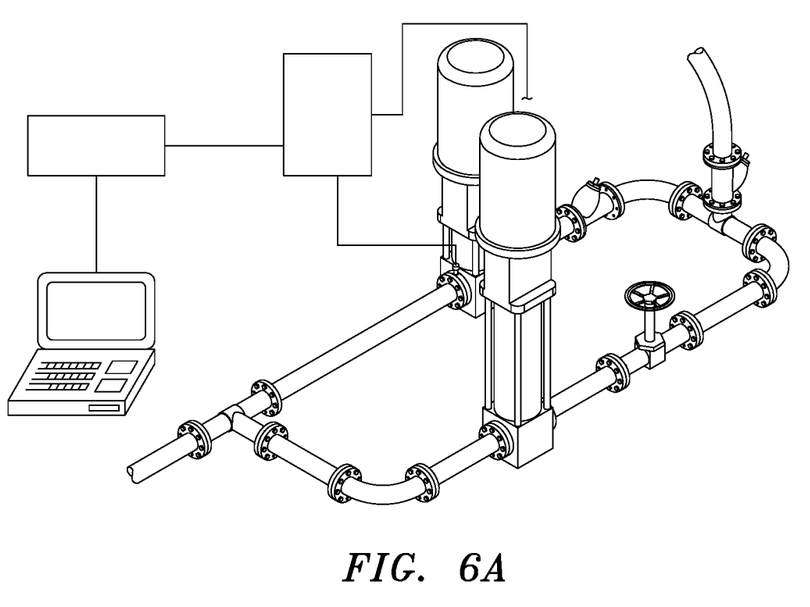
FIG. 6 shows a photograph of a test setup for a direct numeric affinity multistage pumps sensorless converter, according to the present invention.
Figure 6B:
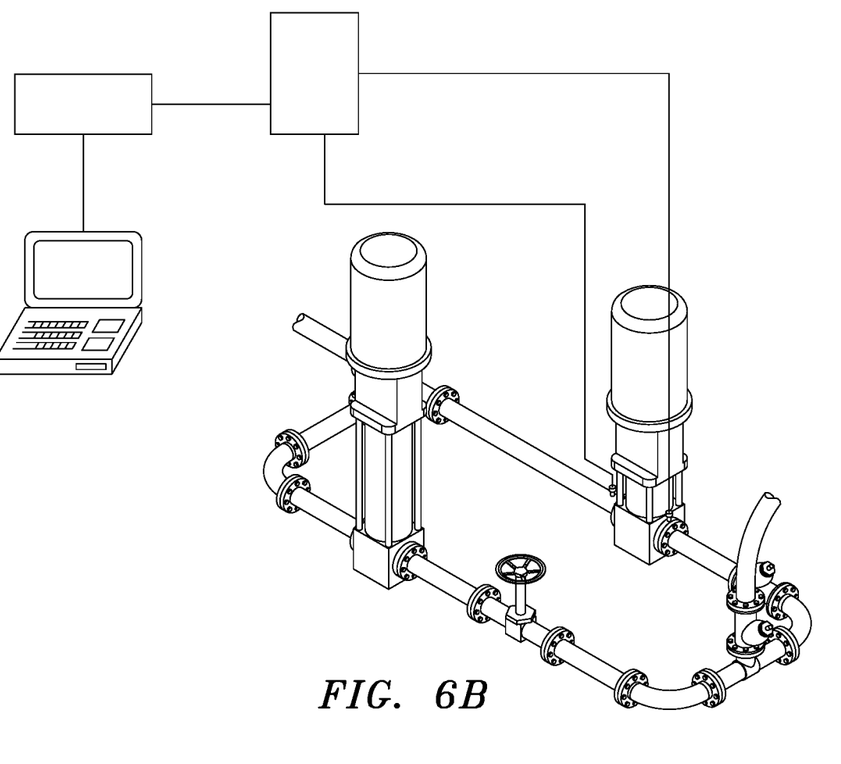

FIG. 6 shows the testing setup for the assignee's sensorless on "Direct Numeric Affinity Multistage Pumps Sensorless Converter" on two Goulds multistage pumps of 33SV (2 stages) and 10SV (5 stages), which consists of the two multistage pumps in parallel in system which can be isolated and tested individually under testing, a 10 HP Danfoss drive FC102, and the assignee's prototype touch screen sensorless control disclosed in reference no. [6]. A flow meter and two pressure sensors for measuring differential pressure in each pump are also installed in the system to acquire the measured data for the comparison with the sensorless conversion readouts. (Reference no. [6] includes U.S. application Ser. No. 15/217,070, filed 22 Jul. 2016, entitled "Advanced real time graphic sensorless energy saving pump control system;" claiming benefit to provisional application Ser. No. 62/196,355, filed 24 Jul. 2015, now abandoned, which are both hereby incorporated by reference.)

2) Data Acquisition and Verification

By using the assignee's "Direct Numeric Affinity Multistage Pumps Sensorless Converter" disclosed herein, the pressure and flow rate values for 33SV and 10SV pumps are converted and compared with the measured data by the sensors. The results are presented in figures as following.

a) SV33 Pump—a 2 Stages Pump

Figure 7A:
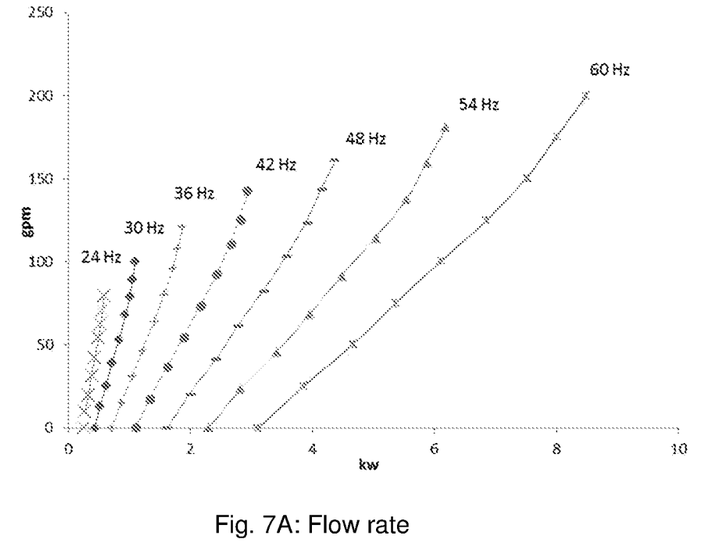
FIG. 7A shows a graph of pump flow rate readings (gpm) vs. drive power (kw) and speed (Hz), including speed of 24 Hz, 30 Hz, 36 Hz, 42 Hz, 48 Hz, 54 Hz and 60 Hz.
Figure 7B:
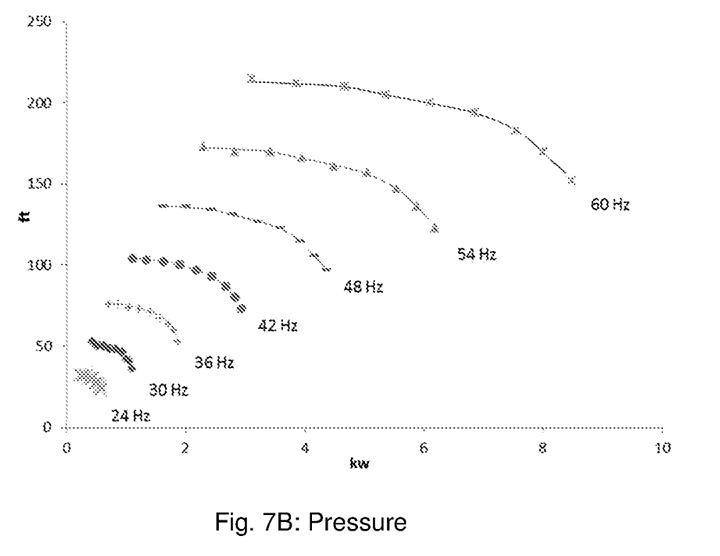
FIG. 7B shows a graph of differential pressure (ft) vs. drive power (kw) and speed (Hz), including speed of 24 Hz, 30 Hz, 36 Hz, 42 Hz, 48 Hz, 54 Hz and 60 Hz.
Figure 7C:
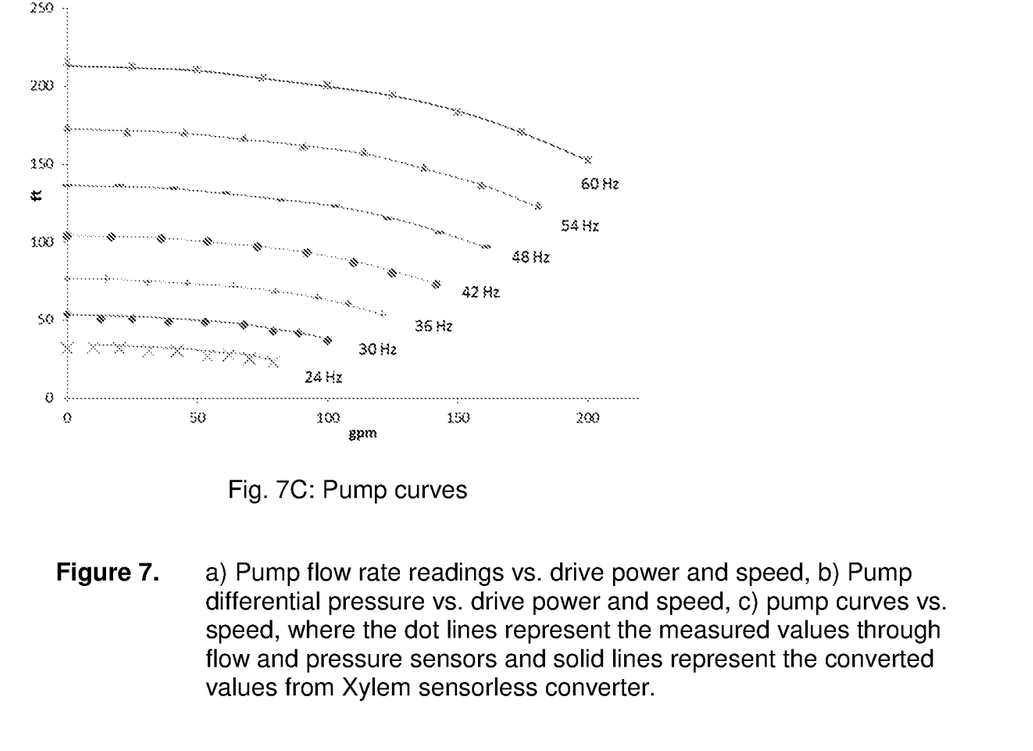
FIG. 7C shows a graph of pump curves (ft re gpm) vs. speed (Hz), including speed of 24 Hz, 30 Hz, 36 Hz, 42 Hz, 48 Hz, 54 Hz and 60 Hz; where the dots or markings (e.g., marks like big "X", diamond, "+", circle, triangle, and small "x") on the lines represent the measured values through flow and pressure sensors and solid (i.e., curved) lines represent the converted values from the sensorless converter.

The pressure and flow rate values for 33SV pump are converted and compared with the measured data, which are shown in FIG. 7, respectively.

The pump differential pressure data converted by the sensorless converter are reasonably accurate with less than 3% over all speed and pump operation hydronic region. The flow rate is also quite accurate which has less than 5% error at speed region above 36 Hz to 60 Hz. The error increasing a little at low speed below 36 Hz and when system is nearly shot off, which may be improved by using the power affinity compensation procedure in reference no. [5] herein.

a) 10 SV Pump—a 5 Stages Pump

Figure 8A:
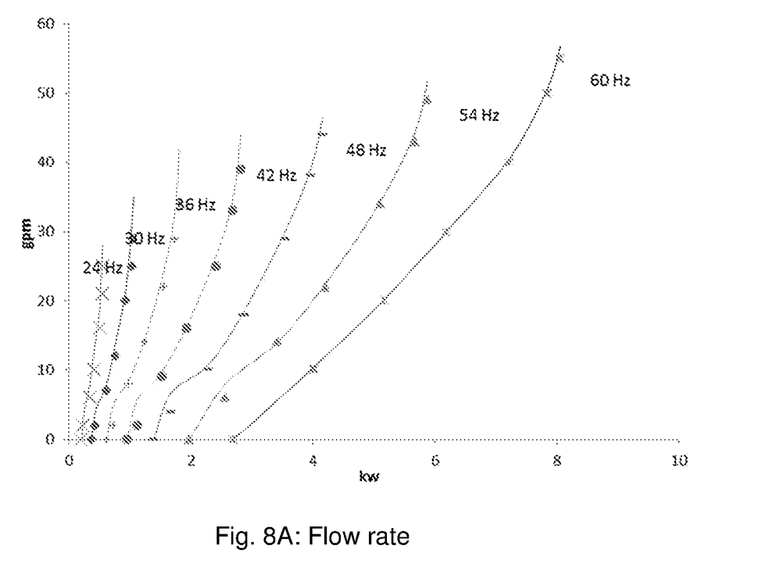
FIG. 8A shows a graph of pump flow rate readings (gpm) vs. drive power (kw) and speed (Hz), including speed of 24 Hz, 30 Hz, 36 Hz, 42 Hz, 48 Hz, 54 Hz and 60 Hz.
Figure 8B:
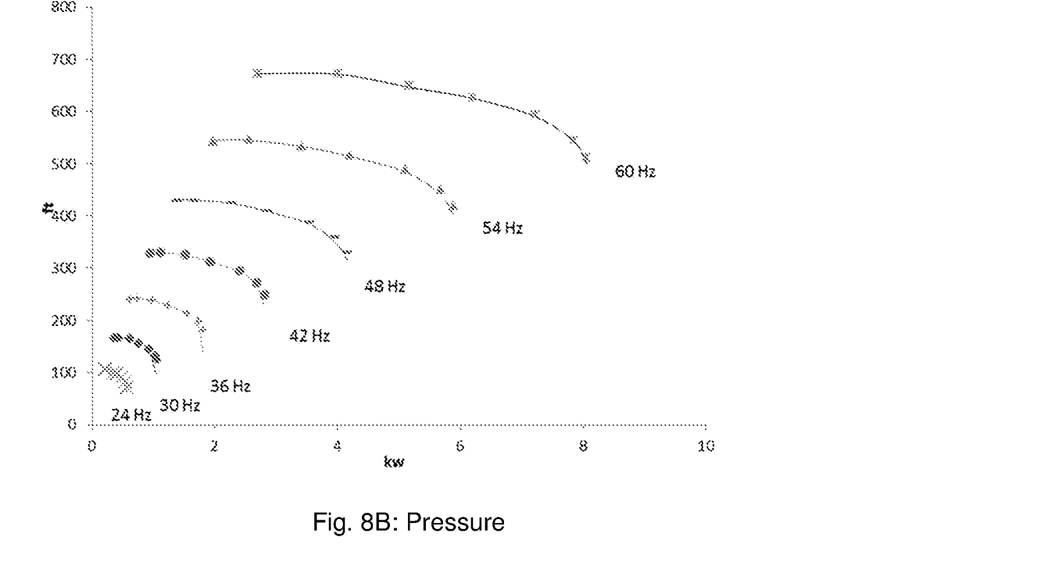
FIG. 8B shows a graph of differential pressure (ft) vs. drive power (kw) and speed (Hz), including speed of 24 Hz, 30 Hz, 36 Hz, 42 Hz, 48 Hz, 54 Hz and 60 Hz.
Figure 8C:
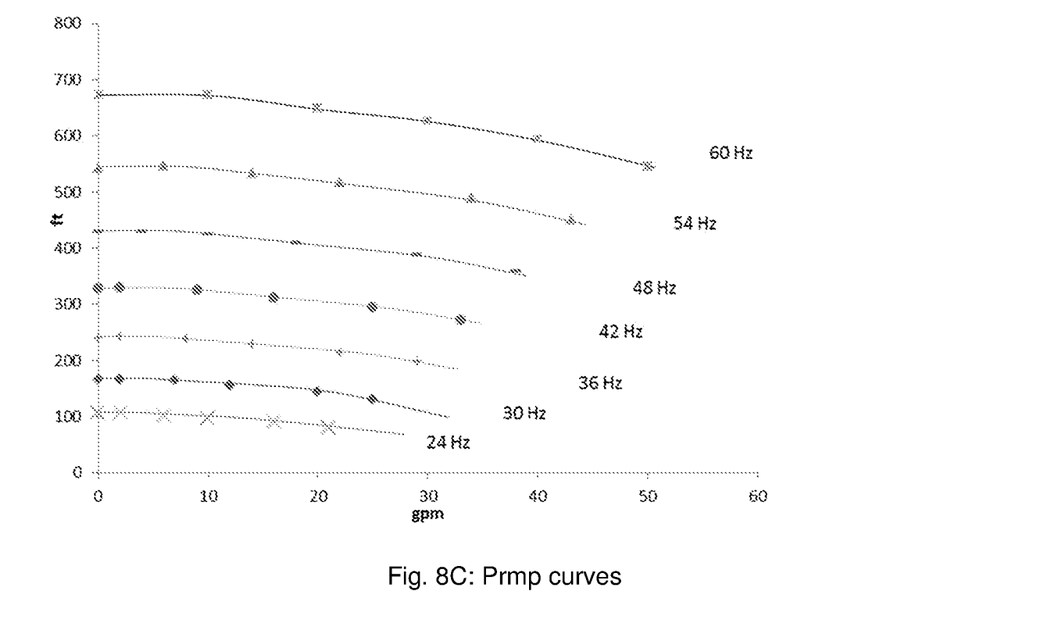
FIG. 8C shows a graph of pump curves (ft re gpm) vs. speed (Hz), including speed of 24 Hz, 30 Hz, 36 Hz, 42 Hz, 48 Hz, 54 Hz and 60 Hz; where the dots or markings (e.g., marks like big "X", diamond, "+", circle, triangle, and small "x") on the lines represent the measured values through flow and pressure sensors and solid (i.e., curved) lines represent the converted values from the sensorless converter.

The pressure and flow rate values for 10 SV pump are converted and compared with the measured data, which are shown in FIG. 8, respectively.

The pump differential pressure data converted by the sensorless converter are very accurate with less than 3% error above speed of 36 Hz and within all pump operation hydronic region. The flow rate is also quite accurate which has less than 10% error at speed region from 36 to 60 Hz. The error increases at lower speed less than 36 Hz and at cut off flow rate around 6 gpm when the valve is nearly shut off.

The Direct Numeric Affinity Multistage Pumps Sensorless Converter disclosed herein may be used for most practical hydronic multistage pumping control and monitoring applications, since it is formulated directly and numerically from pumps characteristics data published by pump manufacturers as well as affinity law, without the need of resolving any characteristic equations reversely as in reference nos. [1-4] herein. The technique may be applied to any form of pump characteristics distribution pump simple or complicated, as long as the monotonic power distribution with respect to flow is preserved. The direct numerical pump sensorless converter developed in this work is much easier to be set up while providing satisfactory accuracy.

Figure 9:
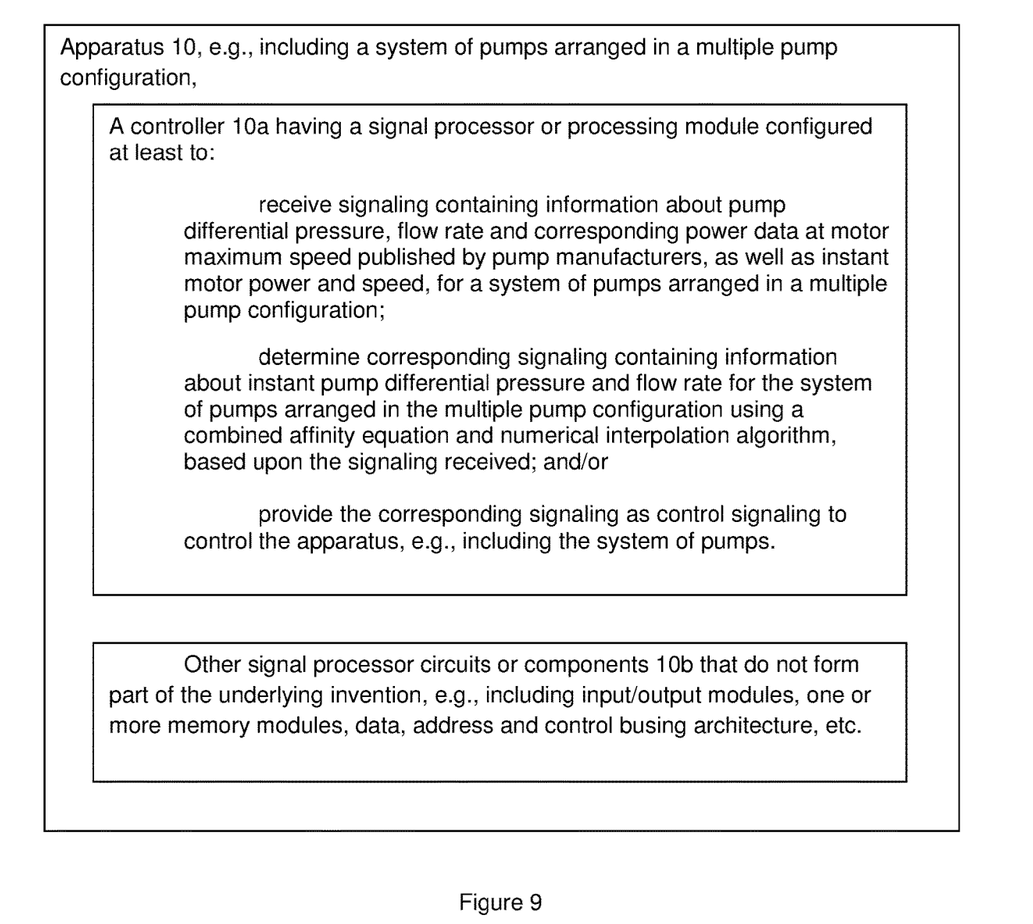
FIG. 9 is a block diagram of apparatus, e.g., having a controller with a signal processor or processing module configured therein, according to some embodiments of the present invention.

FIG. 9: Implementation of Signal Processing Functionality

By way of further example, FIG. 9 shows apparatus 10 according to some embodiments of the present invention for implementing the associated signal processing functionality disclosed herein. The apparatus features a controller 10*a* having a signal processor or processing module configured at least to:

- receive signaling containing information about pump differential pressure, flow rate and corresponding power data at motor maximum speed published by pump manufacturers, as well as instant motor power and speed, for a system of pumps arranged in a multiple pump configuration; and
- determine corresponding signaling containing information about instant pump differential pressure and flow rate for the system of pumps arranged in the multiple pump configuration using a combined affinity equation and numerical interpolation algorithm, based upon the signaling received.

In operation, the signal processor or processing module may be configured to provide corresponding signaling as control signaling to control the system of pumps in the multiple pump configuration, e.g., such as a system of pumps in a hydronic pumping system. By way of example, the corresponding signaling may also be used to control the pumping hydronic system. By way of further example, the instant pump differential pressure and flow rate determined for the system of pumps arranged in the multiple pump configuration may be either further processed and used for further determining control signaling to control the system of pumps in the multiple pump configuration, or may be used as, or form part of, such control signaling to control the system of pumps in the multiple pump configuration.

The signal processor or processing module may be configured in, or form part of, e.g., such a controller, such a system having pumps with such a controller, and/or a hydronic pump system having pumps with such a controller, e.g., which may include or be implemented in conjunction with one or more other controllers configured therein. By way of example, embodiments are envisioned in which the apparatus is, or takes the form of, a system of pumps in a multiple pump configuration, a pump system having a pump system controller or controller with the signal processor or processing module, and embodiments are envisioned in which the apparatus is, or takes the form of, the one or more pump controls or controllers having the signal processor or processing module configured therein.

By way of example, the functionality of the apparatus 10 may be implemented using hardware, software, firmware, or a combination thereof. In a typical software implementation, the apparatus 10 would include one or more microprocessor-based architectures having, e. g., at least one signal processor or microprocessor like element. One skilled in the art would be able to program with suitable program code such a microcontroller-based, or microprocessor-based, implementation to perform the functionality described herein without undue experimentation. For example, the signal processor or processing module may be configured, e.g., by one skilled in the art without undue experimentation, to receive the signaling containing information about pump differential pressure, flow rate and corresponding power data at motor maximum speed published by pump manufacturers, as well as instant motor power and speed, for a system of pumps arranged in a multiple pump configuration, consistent with that disclosed herein.

Moreover, the signal processor or processing module may be configured, e.g., by one skilled in the art without undue experimentation, to determine the corresponding signaling containing information about instant pump differential pressure and flow rate for the system of pumps arranged in the multiple pump configuration using a combined affinity equation and numerical interpolation algorithm, based upon the signaling received, consistent with that disclosed herein.

The scope of the invention is not intended to be limited to any particular implementation using technology either now known or later developed in the future. The scope of the invention is intended to include implementing the functionality of the processors as stand-alone processor, signal processor, or signal processor module, as well as separate processor or processor modules, as well as some combination thereof.

The apparatus 10 may also include, e.g., other signal processor circuits or components 10*b*, including random access memory or memory module (RAM) and/or read only memory (ROM), input/output devices and control, and data and address buses connecting the same, and/or at least one input processor and at least one output processor, e.g., which would be appreciate by one skilled in the art.

Various Points of Novelty

The present invention may also include, or take the form of, one or more of the following embodiments/implementations:

According to some embodiments, the present invention may include, or take the form of, implementations where the Direct Numeric Affinity Multistage Pumps Sensorless Converter means for converting the total pump differential pressure and flow from pump power and speed may include a Multistage Pumps sensorless converter which yields the instant total pump differential pressure and system flow rate with respect to a given pair of motor speed and power readouts from each corresponding pump configured in series or in parallel, based on the individual pump differential pressure, flow rate and power at its pump maximum speed or at a reference speed. The present invention may also include, or take the form of, implementations direct numerical computation procedures to obtain the instant total pump differential pressures and flow rate directly and numerically without a need to reconstruct and solve any pump and system characteristics equations as well.

Figure 1A:
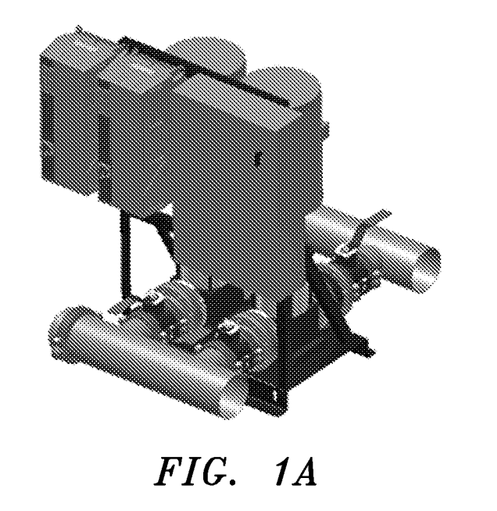
Figure 1B:
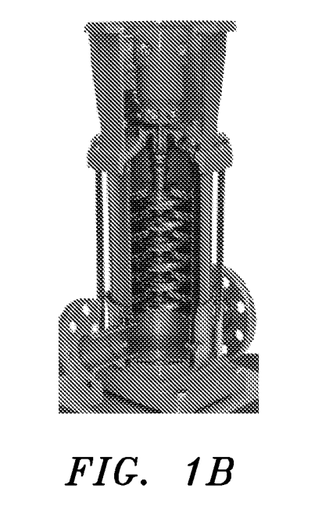
Figure 2:
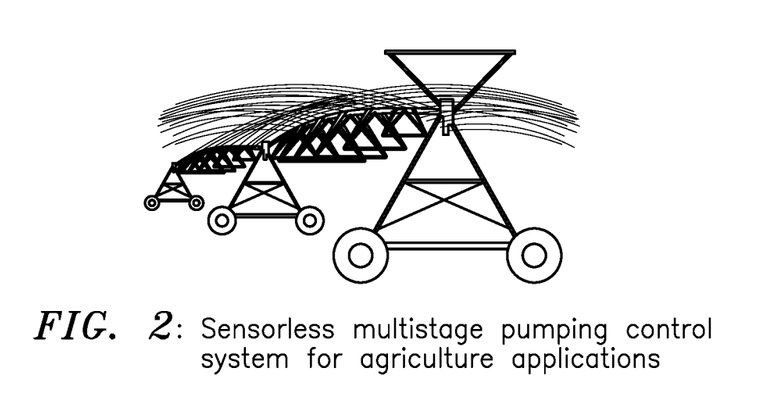
FIG. 2 shows an example of a sensorless multistage pumping control system for agricultural applications.
Figures 4, 4A:
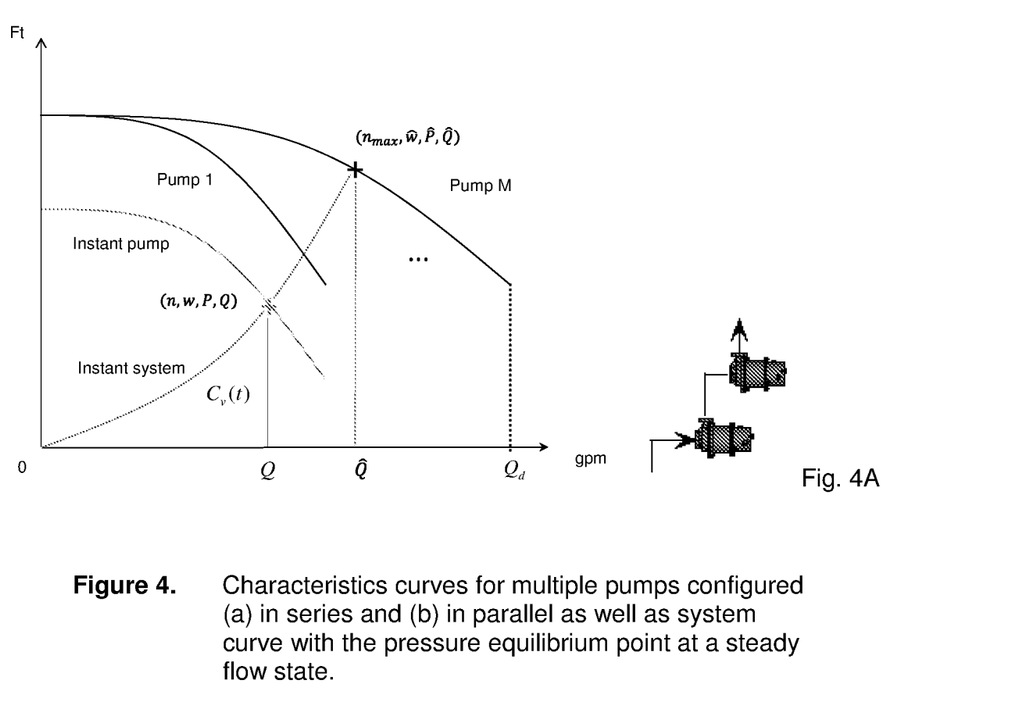
FIG. 4 shows a graph of pressure (Ft) versus flow (gpm) having characteristic curves for multiple pumps configured in series and in parallel as well as a system curve with the pressure equilibrium point at a steady flow state.
FIG. 4A shows an example of multiple pumps arranged in series.

According to some embodiments, the present invention may include, or take the form of, implementations where a multiple pumps system configuration in the Direct Numeric Affinity Multistage Pumps Sensorless Converter mentioned above may include a multistage pump which has one casing with the numbers of impellers included as shown in FIG. 1(B) or the numbers of pumps configured in parallel or in series as shown in FIG. 1(A) or FIGS. 4 and 5, respectively.

According to some embodiments, the present invention may include, or take the form of, implementations where the Direct Numeric Affinity Multistage Pumps Sensorless Converter disclosed herein may include the numerical expressions for total pump differential pressure and flow rate of P and Q in Eqs. 1 and 2 herein for a series pumps configuration with the arbitrary pump characteristics distribution or Eqs. 4 and 5 herein for a series pumps configuration with the identical pump characteristics distribution, at the steady state equilibrium point of the pump differential pressure and system pressure, which is the intersection of the pump and system curves schematically shown in FIG. 4, based upon the individual pump differential pressure and flow rate numerical distribution data of ($P_{ji}$, $Q_{ji}$, $W_{ji}$) at motor full (or a reference) speed and the pump affinity law.

According to some embodiments, the present invention may include, or take the form of, implementations where the Direct Numeric Affinity Multistage Pumps Sensorless Converter disclosed herein may also include the numerical expressions for total pump differential pressure and flow rate of P and Q in Eqs. 6 and 7 herein for a parallel pumps configuration with the arbitrary pump characteristics distribution or 8 and 9 for a parallel pumps configuration with the identical pump characteristics distribution, at the steady state equilibrium point of the pump differential pressure and system pressure which is the intersection of the pump and system curves schematically shown in FIG. 5, based upon the individual pump differential pressure and flow rate numerical distribution data of ($P_{ji}$, $Q_{ji}$, $W_{ji}$) at motor full (or a reference) speed and the pump affinity law.

According to some embodiments, the present invention may include, or take the form of, implementations where the direct numeric distribution functions in the Direct Numeric Affinity Multistage Pumps Sensorless Converter disclosed herein may include the means or technique to formulate the total pump pressure and flow rate distribution functions in terms of power at maximum speed directly and numerically. For that, there is no need to have the system characteristics coefficient to be inversed from the power prior to obtaining total pump pressure and flow rate and the computation accuracy may be improved.

According to some embodiments, the present invention may include, or take the form of, implementations where the direct numeric procedures in the Direct Numeric Affinity Multistage Pumps Sensorless Converter disclosed herein may include the procedures, schematically shown in FIG. 3, as:

1) the corresponding maximum power of $\hat{w}_j$ at pump j maximum speed of $n_{jmax}$ with respect to a pair of instant motor power, speed of $n_j$ and $w_j$ may be obtained by using power affinity equation,
2) the corresponding differential pressure and flow rate of $\hat{P}_j$ and $\hat{Q}_j$ for the power of $\hat{w}_j$ for pump j at its $n_{jmax}$ by using numeric interpolation directly,
3) the instant pressure and flow rate of $P_j$ and $Q_j$ with respect to instant motor speed and power of $n_j$ and $w_j$ may be achieved by the pressure and flow affinity equations based upon the pump differential pressure and flow rate of $\hat{P}_j$ and $\hat{Q}_j$ obtained for pump j, and/or
4) the instant total pump differential pressure and flow rate of P and Q can then be obtained by superposition of each individual pump pressure and flow rate of $P_j$ and $Q_j$, with j=1 . . . M, respectively.

According to some embodiments, the present invention may include, or take the form of, implementations where the steady state pressure equilibrium point in the direct numeric affinity Multistage Pumps sensorless converter disclosed herein may include the intersection point of the overall pump curve and system curve for a series pumps system, as shown in FIG. 4 schematically, or for a parallel pumps system, as shown in FIG. 5 schematically, or their corresponding multistage pumps. By way of example, the instant total pump differential pressure and flow rate may be resolved at the pressures equilibrium point based upon the summation of individual pump pressure a pair of each individual motor readout power and speed values.

According to some embodiments, the present invention may include, or take the form of, implementations where the numeric methods in the direct numeric affinity Multistage Pumps sensorless converter disclosed herein may include any kinds of numerical interpolation and fitting algorithms to obtain the pump differential pressure and flow rate of $\hat{P}_j$ and $\hat{Q}_j$ at pump j maximum speed. For a little or less complicated distributions, however, the piecewise numeric interpolation may be recommended to achieve better functional representation and accuracy.

According to some embodiments, the present invention may include, or take the form of, implementations where obtaining the power of $\hat{w}_j$ at maximum pump speed in the direct numeric affinity Multistage Pumps sensorless converter disclosed herein by using the pump power affinity function upon each individual pump. A preferred version of the modified power affinity function may be formulated similarly with a numerical distribution expression of $\overline{w}_{jnorm}(n_{ji}, W_{ni}, n_j)$ in Eq. 3, calibrated based upon an array of the discrete and normalized motor power data of ($n_{ji}$, $W_{ji}$) at any system position, which may again be obtained numerically by interpolation or fitting. The modified power affinity function calibrated may be introduced to compensate the power loss due to motor speed slip at low speed region.

According to some embodiments, the present invention may include, or take the form of, implementations where the pump and power curves data at motor maximum speed (or at a reference speed) in the direct numeric affinity Multistage Pumps sensorless converter for converting the total pump differential pressure and flow from pump power and speed may include the pump and power curves data published by pump manufacturers or a few points of pump data acquired at motor full speed in field. Here, the motor power curve data may also be replaced by any potential motor electrical or mechanical readout signals, such as motor current or torque, and so forth. The signals may be readouts from sensors or from a drive.

According to some embodiments, the present invention may include, or take the form of, implementations where the pumping hydronic system in the direct numeric affinity Multistage Pumps sensorless converter for converting the total pump differential pressure and flow from pump power and speed may include all close loop hydronic pumping systems, such as primary pumping systems, secondary pumping systems, water circulating systems. The systems mentioned here may consist of a single zone or multiple zones as well. The systems disclosed herein may include open loop systems as well, such as, pressure booster systems, with the certain conditions, such as with a considerable constant suction pressure supply, or with a pressure tank or with a pressure sensor installed at pump suction.

According to some embodiments, the present invention may include, or take the form of, implementations where hydronic signals in the direct numeric affinity Multistage Pumps sensorless converter for converting the total pump differential pressure and flow from pump power and speed may include pump differential pressure, system pressure or zone pressure, system or zone flow rate, and so forth.

According to some embodiments, the present invention may include, or take the form of, implementations where input signals for in the direct numeric affinity Multistage Pumps sensorless converter for converting the total pump differential pressure and flow from the signals other than pump power and speed mentioned here may include motor current, torque, some other alternative signals. The input signals may be readouts from sensors directly, or other alternative means as well, such as a drive.

According to some embodiments, the present invention may include, or take the form of, implementations where control signals transmitting and wiring technologies may include all conventional sensing and transmitting means that are used currently. Preferably, wireless sensor signal transmission technologies would be favorable.

According to some embodiments, the present invention may include, or take the form of, implementations where the pumps disclosed herein for hydronic pumping systems may include a single pump, a multistage pump, a circulator, a group of parallel ganged pumps or circulators, a group of serial ganged pumps or circulators, or their combinations.

According to some embodiments, the present invention may include, or take the form of, implementations where systems flow regulation may include manual or automatic control valves, manual or automatic control circulators, or their combinations.

Computer Program Product

The present invention may also, e. g., take the form of a computer program product having a computer readable medium with a computer executable code embedded therein for implementing the method, e.g., when run on a signal processing device that forms part of such a pump or valve controller. By way of example, the computer program product may, e. g., take the form of a CD, a floppy disk, a memory stick, a memory card, as well as other types or kind of memory devices that may store such a computer executable code on such a computer readable medium either now known or later developed in the future.

Other Related Applications

The application is related to other patent applications that form part of the overall family of technologies developed by one or more of the inventors herein, and disclosed in the following applications:

U.S. application Ser. No. 12/982,286, filed 30 Dec. 2010, entitled "Method and apparatus for pump control using varying equivalent system characteristic curve, AKA an adaptive control curve," which issued as U.S. Pat. No. 8,700,221 on 15 Apr. 2014; and U.S. application Ser. No. 13/717,086, filed 17 Dec. 2012, entitled "Dynamic linear control methods and apparatus for variable speed pump control," which claims benefit to U.S. provisional application No. 61/576,737, filed 16 Dec. 2011, now abandoned;

U.S. application Ser. No. 14/730,871, filed 4 Jun. 2015, entitled "System and flow adaptive sensorless pumping control apparatus energy saving pumping applications," which claims benefit to provisional patent application Ser. No. 62/007,474, filed 4 Jun. 2014, now abandoned; and U.S. application Ser. No. 14/969,723, filed 15 Dec. 2015, entitled "Discrete valves flow rate converter," which claims benefit to U.S. provisional application No. 62/091,965, filed 15 Dec. 2014;

U.S. application Ser. No. 15/044,670, filed 16 Feb. 2016, entitled "Detection means for sensorless pumping control applications," which claims benefit to U.S. provisional application No. 62/116,031, filed 13 Feb. 2015, entitled "No flow detection means for sensorless pumping control applications;"

which are all assigned to the assignee of the instant patent application, and which are all incorporated by reference in their entirety herein.

Data Published Pump Manufacturer

One skilled in the art would appreciate and understand that pump manufacturers publish data related to pumps that are designed, manufactured and sold by the manufacturer. The published data may include various information about the pump, e.g., including information about pump differential pressure, flow rate and corresponding power data at motor maximum speed, e.g., based upon in-house manufacturer pump testing during the pump's design. Such published information by the manufacturer may be used by a pump purchaser, or a pump design engineer, etc., in relation implementing the pump in any particular pump application, controlling the pump in any particular pump application, etc. The published pump data may be published in bound technical manuals, available on the Internet online, available on CDROMs, etc., e.g., and may include installation instructions, maintenance information, charts, graphs, accompanying illustrations/diagrams, etc.

The Scope of the Invention

It should be understood that, unless stated otherwise herein, any of the features, characteristics, alternatives or modifications described regarding a particular embodiment herein may also be applied, used, or incorporated with any other embodiment described herein. Also, the drawing herein is not drawn to scale.

Although the present invention is described by way of example in relation to a centrifugal pump, the scope of the invention is intended to include using the same in relation to other types or kinds of pumps either now known or later developed in the future.

Although the invention has been described and illustrated with respect to exemplary embodiments thereof, the foregoing and various other additions and omissions may be made therein and thereto without departing from the spirit and scope of the present invention.

What we claim is:

1. A system, comprising:
pumps arranged in a multiple pump configuration, each pump being configured to operate at a respective instant motor power and speed; and
a controller having a signal processor or processing module configured at least to:
receive signaling containing information about pump differential pressure, flow rate and corresponding power data at motor maximum speed published by manufacturers of the pumps, as well as the respective instant motor power and speed for the pumps; and
determine control signaling containing information about instant pump differential pressure and flow rate using a combined affinity equation and numerical interpolation algorithm to control the pumps, based upon the signaling received.

2. A system according to claim 1, wherein the signal processor or processing module is configured to determine the corresponding signaling by implementing the combined affinity equation and numerical interpolation algorithm as follows:

obtaining a corresponding maximum power at the pump's maximum speed with respect to the instant motor power and speed parameters using a power affinity equation;

obtaining corresponding pump differential pressure and flow rate with respect to the corresponding maximum power at the pump's maximum speed using direct numerical interpolation; and determining the instant pump differential pressure and flow rate with respect to the instant motor speed and power by using pressure and flow affinity equations.

3. A system according to claim 2, wherein the signal processor or processing module is configured to determine the instant pump differential pressure and flow rate by implementing the combined affinity equation and numerical interpolation algorithm and using numerical computation procedures as follows:

$$Q(n, w) = \left(\frac{n}{n_{max}}\right) \cdot \bar{q}(n_{max}, W_i, Q_i, \hat{w}(n, w)), \quad (1)$$

$$P(n, w) = \left(\frac{n}{n_{max}}\right)^2 \cdot \bar{p}(n_{max}, W_i, P_i, \hat{w}(n, w)), \quad (2)$$

where $\bar{q}(n_{max}, W_i, Q_i, \hat{w})$ and $\bar{p}(n_{max}, W_i, P_i, \hat{w})$ are pump differential pressure and flow rate distribution functions with respect to power and formulated numerically based upon discrete pump data of $(P_i, Q_i, W_i)$ at motor full speed, and $\hat{w}$ is a corresponding power function at pump full speed by the power affinity equation of $$\hat{w}(n, w) = (n/n_{max})^{-3} \cdot w. \quad (3)$$

4. A system according to claim 1, wherein the pumps are arranged in series in the multiple pump configuration.

5. A system according to claim 1, wherein the pumps are arranged in parallel in the multiple pump configuration.

6. A system according to claim 1, wherein the controller is a direct numeric affinity multistage pumps sensorless converter configured to obtain the instant pump differential pressure and flow rate without sensing pump pressure or flow of the pumps.

* * * * *